April 4, 1961 R. W. KRITZER 2,977,918
METHOD OF MAKING HEAT TRANSFER UNITS
Filed July 5, 1957 5 Sheets-Sheet 4
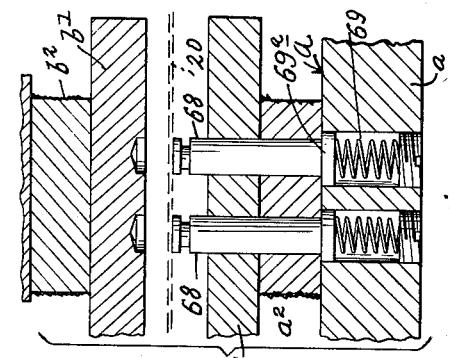
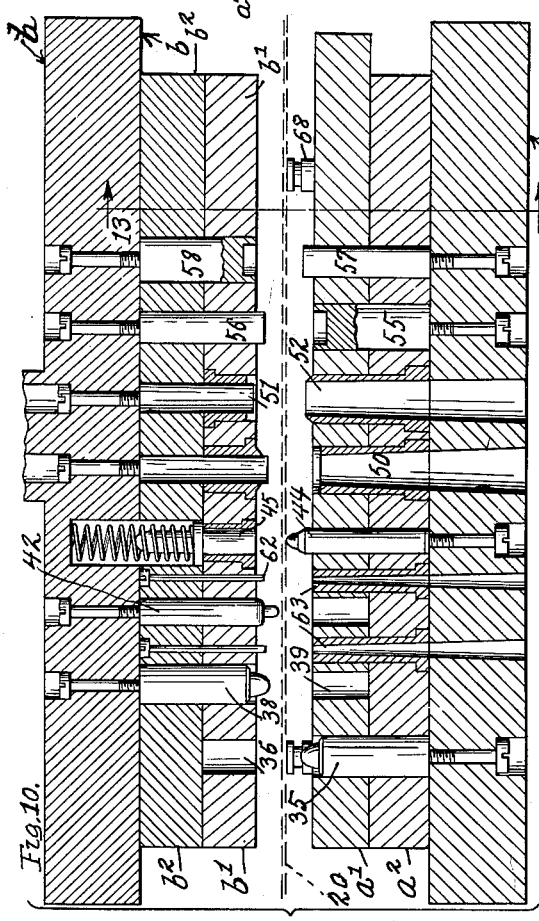
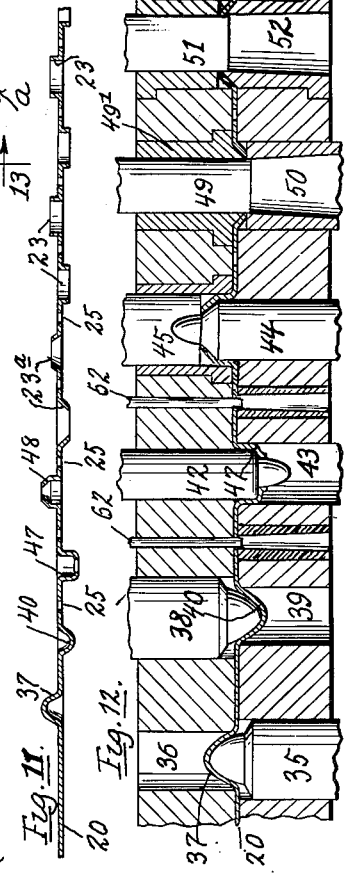
Richard W. Kritzer
By Fred Gerlach
His Attorney

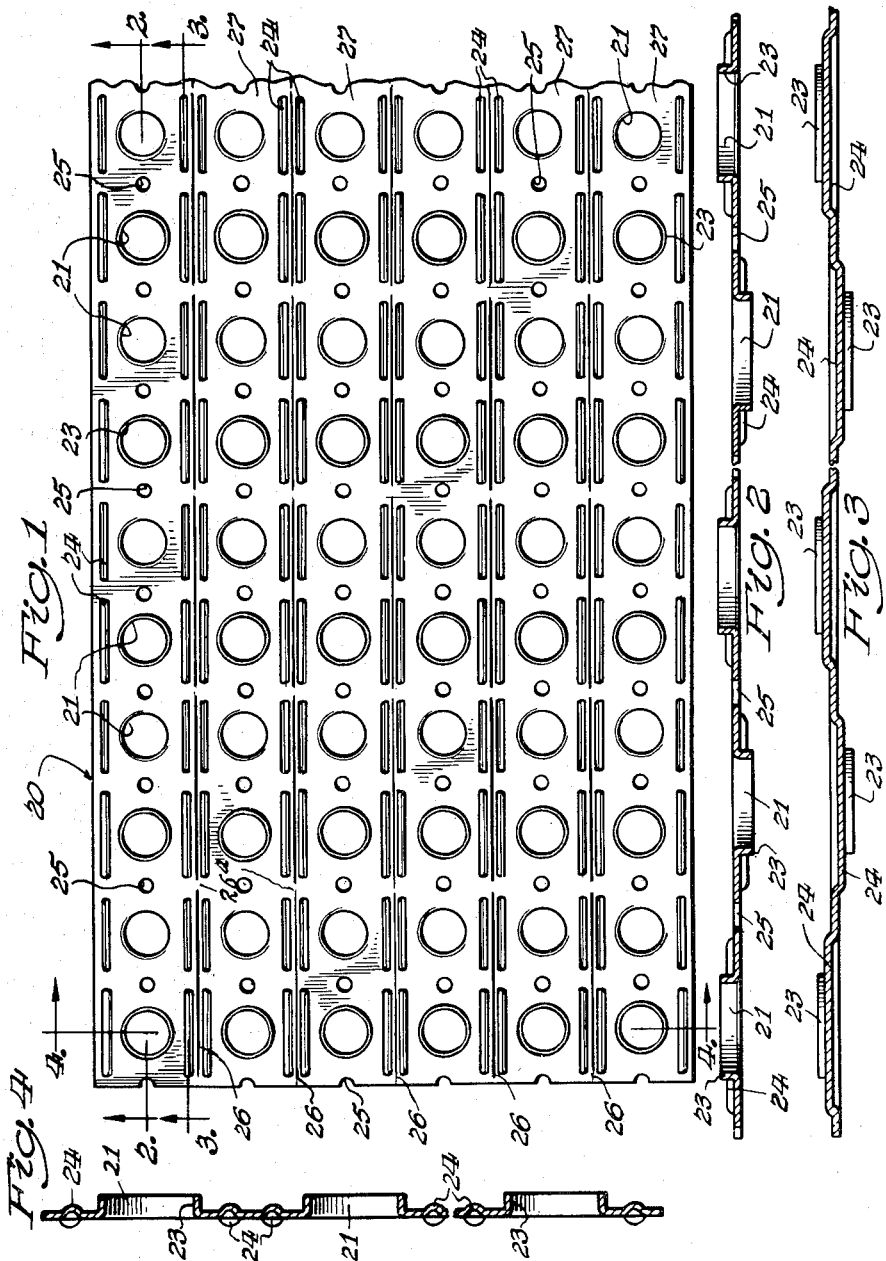

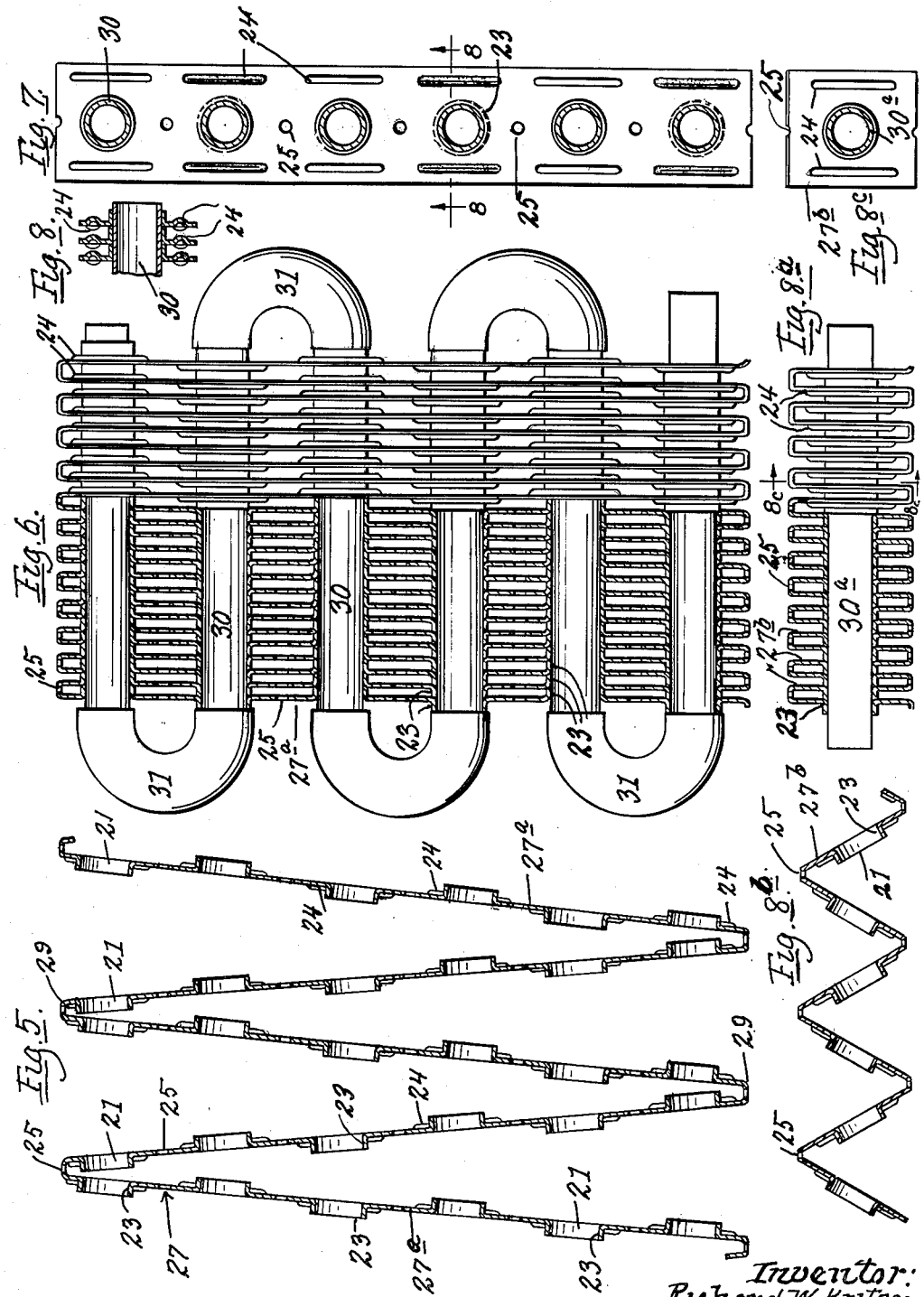

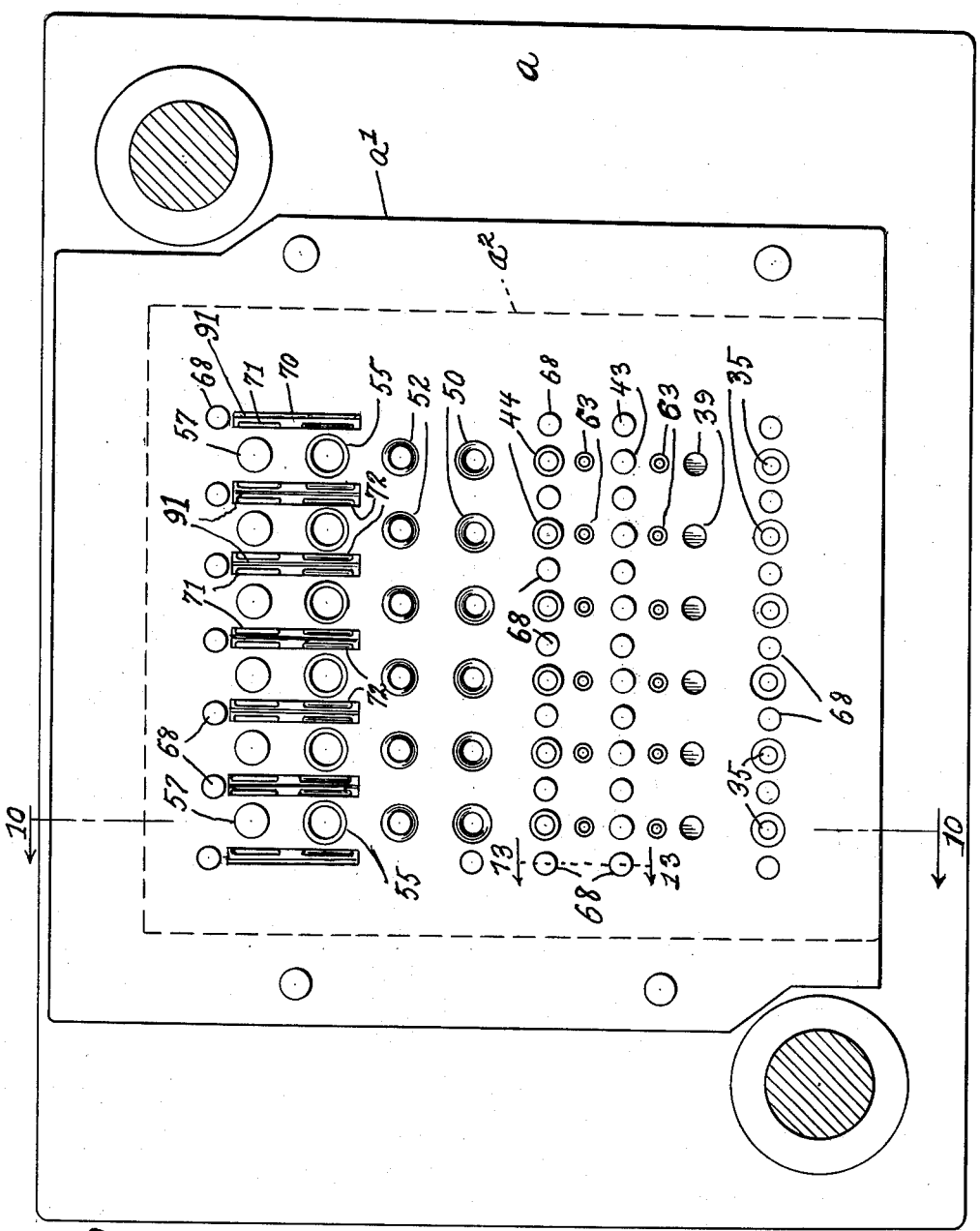

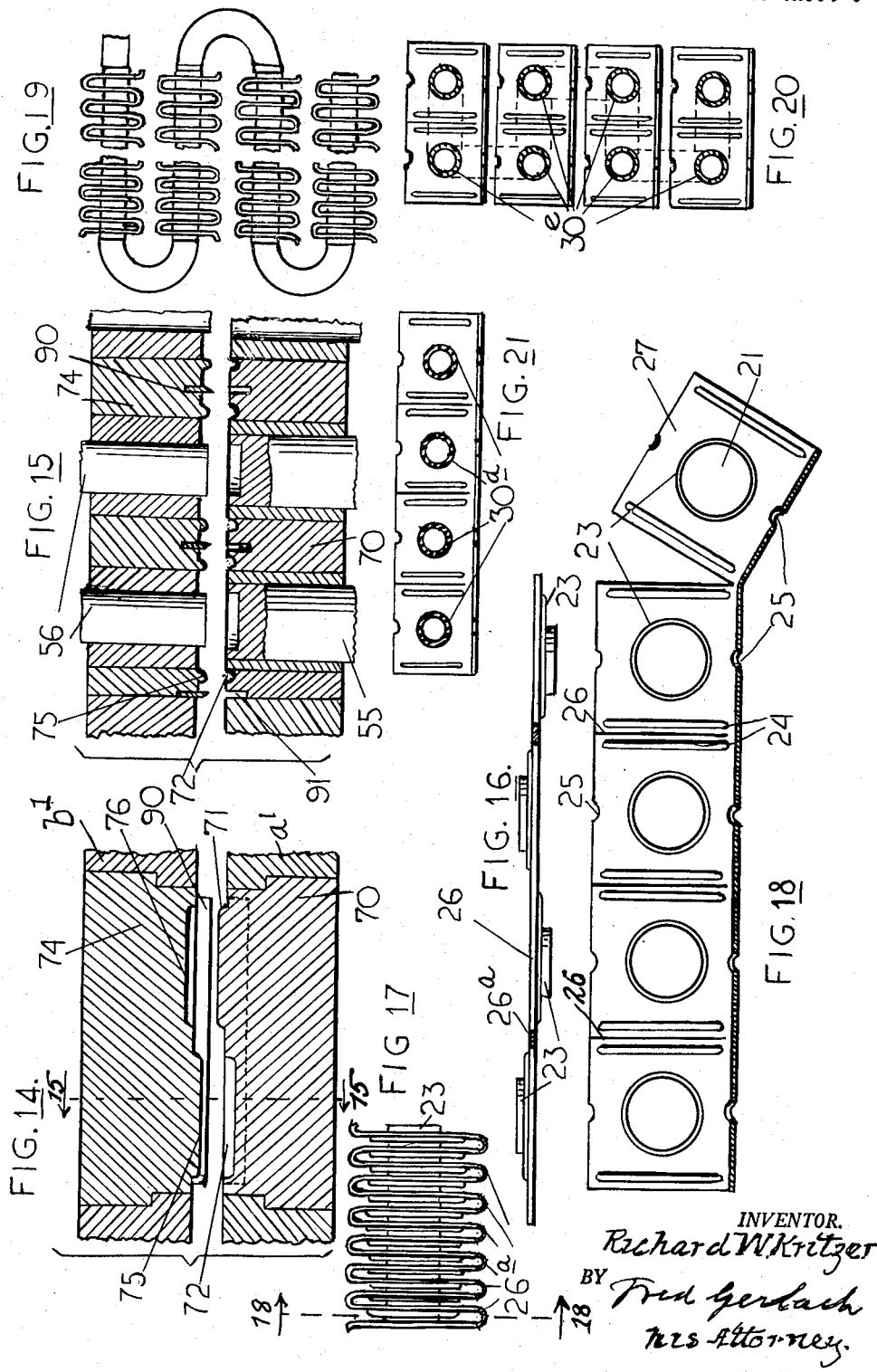

United States Patent Office 2,977,918
Patented Apr. 4, 1961

2,977,918
METHOD OF MAKING HEAT TRANSFER UNITS
Richard W. Kritzer, 5830 N. Pulaski Road, Chicago, Ill.
Filed July 5, 1957, Ser. No. 670,171
3 Claims. (Cl. 113—118)

The invention relates to the fabrication of heat-transfer units which are composed of tubing and cross-fins assembled in heat conductive relation.

The several objects of the invention are to provide; a product derived from an elongated sheet or continuous web of fin-stock and fabricated with openings surrounded by annular flanges longitudinally consecutive in a series of transverse zones for forming fin-strips which are severable from the stock and adapted without further or special fabrication to form fins on tubing having different lengths, spacings or numbers of sections in different units; a method of fabricating said product; to provide such product additionally with perforations for air flow through the fins and ribs for turbulence between them; a method of expeditiously and economically fabricating such product from a continuous web; a method and a product which renders the fabricated web severable into strips singly or in multiple for fins in different units; and other objects which will appear from the detail description.

The invention consists in the several novel features hereinafter set forth and more particularly defined by claims at the conclusion hereof.

In the drawings:

Fig. 1 is a plan view of a continuous web of fin-stock fabricated with openings for tubing surrounded by annular flanges, turbulence ribs, and perforations for air flow, before it is bent transversely to form fins;

Figs. 2 and 3 are sections on lines 2—2 and 3—3, respectively, of Fig. 1;

Fig. 4 is a section on line 4—4 of Fig. 1;

Fig. 5 is a longitudinal section of a strip in the process of being bent into fins with serially connected parallel sections for a unit with multiple tubing-sections;

Fig. 6 is a plan, partly in section, of a unit assembled with strips shown in Fig. 5;

Fig. 7 is an end elevation of the unit shown in Fig. 6, the tubing being shown in transverse section;

Fig. 8 is a section on line 8—8 of Fig. 7;

Fig. 8a is a side elevation, partly in section, of a unit with a single section of tubing and a single strip of fins;

Fig. 8b is a longitudinal section of the strip during its bending into fins for the unit shown in Fig. 8a;

Fig. 8c is a section on line 8c—8c in Fig. 8a;

Fig. 9 is a plan of the stationary bed of a press with tools thereon for carrying out the method of fabricating the web as illustrated in Fig. 1, the posts for guiding the movable head being shown in section;

Fig. 10 is a vertical section on line 10—10 of Fig. 9 of the press including the gangs of mating tools on the bed and the head;

Fig. 11 is a longitudinal section of the fin-stock showing it in its successive stages;

Fig. 12 is a section of mating gangs of tools on the press in their operative or closed position with the fin-stock therebetween;

Fig. 13 is a partial section on line 13—13 of Fig. 10;

Fig. 14 is a vertical longitudinal section of a pair of dies for embossing ribs in the fin-stock;

Fig. 15 is a section taken on line 15—15 of Fig. 14;

Fig. 16 is a longitudinal section of the fabricated web on the line of the longitudinal slits before the web is bent into serially connected fins;

Fig. 17 is a transverse section on the line of the longitudinal slits after the fabricated web has been bent to form fins;

Fig. 18 is a transverse section taken on line 18—18 of Fig. 17 showing one strip being severed from the other strips of the web;

Fig. 19 is a side elevation of a unit with fins formed by separate strips on parallel transversely spaced sections of tubing;

Fig. 20 is an end view of a unit with a pair of tubing-coils in sidewise relation; and Fig. 21 is a transverse section of a unit with a series of parallel tubing-sections and fabricated strips attached together to form continuous transverse fins on the tubing-sections.

The invention includes a method of fabricating a product into fins serially connected at alternate ends from an elongated sheet or continuous web of suitable stock 20 such, for example, as sheet-aluminum .006" in thickness supplied from a coil ranging up to 5000 feet in length wound on a storage reel (not shown). The invention also includes the product of said method. The web is of sufficient width to include a transverse series of longitudinal zones each of which is fabricated with a series of symmetrically spaced groups of openings 21 with surrounding flanges 23, embossed turbulence ribs 24 and perforations 25 throughout the length of the web. The web and transverse series of zones are severable to form fabricated strips which are transversely bendable into serially connected cross-fins. This fabrication can be expeditiously and economically performed simultaneously in the transverse series of and sequentially in the longitudinal zones by a power-press which comprises a stationary bed $a$ with demountable plates $a1$ and $a2$ and a coacting reciprocable head $b$ with demountable plates $b1$ and $b2$. Gangs of mating tools for simultaneously fabricating said groups in the transverse series of zones of the web are operatively and demountably supported by the press. Each gang includes a longitudinal set supported on or formed in the bed $a$ and a coacting or mating set supported or formed in head $b$. Flanges 23 around openings 21 and ribs 24 are formed in longitudinal pairs. Alternate flanges 23 and associated ribs 24 project from opposite faces of the web of fin-stock (Fig. 2).

Each gang comprises: a tool 35 on bed $a$, mating with a socket 36 in plate $b1$ for forming an upward bulge 37, and a tool 38 on head $b$ mating with a socket 39 in plate $a1$, for simultaneously forming a downward bulge 40 in the stock when the leading end of the web is at its first station; a pair of punches 62 on head $b$, mating with sockets 63 on bed $a$, for punching a pair of longitudinally spaced perforations 25 in stock 20, a tool 42 on head $b$ mating with a socket 43 in plate $a1$, for forming and piercing a downward bulge 47, and a tool 44 on bed $a$, mating with a socket 45 on head $b$, for forming a ruptured upward bulge 48, all simultaneously when the stock 20 is advanced to the next station where bulges 37 and 40 register with tools 42 and 44; a punch 49 on head $b$, mating with a sleeve 50 on bed $a$, a sleeve 49' around punch 49 having an annular downwardly tapered end-face for forming an opening 21 surrounded by a downwardly tapered flange 23a, and a punch 51 in a sleeve in plate $b1$, mating with a sleeve 52 which has an upwardly tapered end-face, for simultaneously forming an upward tapered annular flange 23a when the stock is advanced to the next station where bulges 47 and 48 register with punches 49 and 51, respectively;

a tool 56 on head b, mating with a female die 55 on bed a for shaping a downwardly tapered flange 23a into a right-angled flange 23, and a tool 57 on bed a, mating with a female die 58 in head b, for simultaneously shaping an upwardly tapered flange 23a into an upward right-angled flange 23, dies 70 in plate a1 having ribs 71 and recesses 72 mating, respectively, with recesses 76 and ribs 75 in dies 74 which are mounted in plate b1 for simultaneously forming pairs of oppositely embossed ribs 24 on opposite faces of the web at the sides of alternate longitudinal pairs of flanges 23 when the web has been advanced to register the flanges 23a with the tools 56 and 57, respectively; and knives 90 on dies 74 which coact with channels 91 in dies 70 to cut simultaneously with the forming of ribs 24, longitudinal slits 26 in the web alongside of a longitudinal pair of flanges 23 with tabs 26a between the ends of said slits.

In forming the flanges 23, the stock is oppositely bulged as at 37 and 40, then reversely bulged and punctured, then punched with surrounding tapered flanges 23a, and then accurately shaped into substantially right-angled flanges 23. Web 20 is yieldingly supported over bed a during fabrication of the web by the upper ends of plungers 68 which are slidable vertically in bed a, and urged upwardly by springs 69 to engage stop-shoulders 69a with plates a2. Springs 69 yield downwardly during the forming operations and plungers 68 strip the stock from the tools during retraction of the head b. Punches 62 discharge the severed disks of metal through sleeves 63 and bed a. Punches 49 and 51 discharge severed disks of metal through sleeves 50 and 52 and bed a.

The tools of each set are symmetrically spaced in longitudinal alignment along the strip-forming longitudinal zones. Web 20 is intermittently advanced equidistant steps; to first simultaneously form a pair of opposite bulges 37 and 40 in each of said zones; next to register bulges 37 and 40 with tools 42 and 44 and simultaneously form reverse and punctured bulges 47 and 48 and for punching perforations 25 in each of said transverse zones; next to register bulges 47 and 48 with punches 49 and 51 and simultaneously form a pair of tapered flanges 23a in each of said zones; next to register flanges 23a with tools 56 and 57 and simultaneously form a pair of flanges 23 and a pair of embossed ribs at the sides of each flange 23 and to cut slits 26 along sequential pairs of openings 23 during consecutive steps of the web so that groups of a pair of openings 21 and flanges 23, ribs 24 and slits 26 alongside of each pair of openings 23 will be formed in a continuous series along the strip-forming zones during a single traverse of the fin-stock.

The web, fabricated as shown in Figs. 1 to 3, may be bent transversely to form transverse planar faces serially connected by bends along their alternate outer margins (Fig. 17) with the openings 21 and flanges 23 in each longitudinal zone axially aligned and equidistantly spaced in said transverse faces. When the web is thus bent, slits 26 intersect the connecting bends along one margin of said planar faces and tabs 26a retain the longitudinal zones of the web connected along the opposite margin of said faces. The strips in the longitudinal zones may be severed from one another by tearing apart the series of tabs 26a at the bends along one margin of said planar faces, as illustrated in Fig. 18.

Sections including the desired number of bends for forming serially connected fins for sections of tubing of a predetermined length may be severed transversely and sequentially from the web. Such sections of severable fabricated strips constitute a product which is selectively usable to equip different coils of tubing with fins.

By increasing the width of the web for transversely additional longitudinal zones and gangs of tools accordingly, the output may be increased. The bends 29 of the strips intersect the perforations 25 to permit air to pass through the fins. The cross-sectional length of flanges 23 adapts them to engage contiguous fins and to equally space them apart and in parallel relation.

The general demand includes heat-transfer units for different uses, for use in different locations, of different capacities, and sections or coils of tubing in a wide diversity of lengths. A desideratum is to provide a fabricated product adapted to form fins for maximum diversity of units and is derived from a continuous web without special or further fabricating for such units, for example, units with tubing of different lengths or coils with single or multiple sections. The transversely bent sections of the fabricated web and the severed or severable strips exemplify such products with longitudinal series of fabricated groups of openings 21 surrounded by flanges 23, ribs 24 and perforations 25. The prefabricated sections or strips being adapted to form fins on such diversity of tubing expedite the assembly of units with such varying coils of tubing and dispenses with the necessity of maintaining a large stock of or special fabrication of fin-structures for such units.

Heat-transfer units for air conditioners have to a considerable extent become standarized with respect to diameter and spacing between tubing-sections so that the fabricated web and strips are adapted to form fins for tubing of widely different lengths or number of sections.

A unit with a single tubing-section 30a (Figs. 8a, 8b and 8c) may be assembled with a fabricated strip of suitable length to form fins on the desired area of the tubing-sections, by endwise insertion of section 30a through the axially aligned openings 21 and flanges 23 of the strip. Flanges 23 project unidirectionally from corresponding faces of the fins. The strip may be contracted longitudinally to force the contiguous flanges 23 into abutting relation. Perforations 25 permit air to pass through the bends 29. Ribs 24 produce turbulence in the cells between said bends. The tubing-section secured in the series of flanges 23 will form the assembled unit.

A unit (Figs. 6 and 7) having a coil with a series of parallel sections 30 serially connected by bends 31 is assembled with a fabricated strip which is bent at 29 to form fins 27a, each with a series of openings 21 and flanges 23 corresponding in number to the number of sections 30 in the coil between the bends 29. Tubing-sections 30 inserted endwise through the axially aligned series of openings 21 and flanges 23 and secured together by bends 31 support the fins on the tubing. Serially successive strips with like bends may be used to form fins over partial areas of the tubing-sections. Flanges 23 on alternate sections 27a project from opposite faces of the strips. Each section 27a forms a continuous cross-fin for the entire series of tubing-sections. Each section will have associated with each flange 23, perforations 25 and ribs 24. By varying the spacing between bends 29, the strips may be used on coils with coil-sections of varying number.

A unit with a coil of four parallel tubing-sections 30a spaced apart any greater distance than the centers of the flanges 23 and serially connected by bends 30e (Fig. 19) may be assembled with fabricated strips bent similarly to those shown in Figs. 8a and 19. The tubing-sections are individually inserted through the axially aligned openings 21 and flanges 23 of the strips and then secured together to support the fins thereon.

For a unit including a pair of serially connected side-by-side coils (Fig. 20) in which each coil includes a series of four parallel reaches 30g connected by end-bends, fabricated and bent strips of attached pairs are severed from the web at slits 26 and tabs 26a. Pairs of tubing-sections 30g are inserted through axially aligned openings 21 and flanges 23 of each attached pair of strips and secured together by bends to support the strips and permit air flow transversely across the confronting faces or cells between the transverse faces of the attached fins.

Fabricated and transversely attached strips may be used to form fins on a coil including a coplanar series of four straight reaches of tubing (Fig. 21). A group of four bent and transversely attached fabricated strips are severed from the web along a slit 26 and tabs 26a. Tubing-sections are inserted through axially aligned openings 21 and flanges 23 of the strips and secured by end-bends to support the transverse planar faces of the strips in transversely aligned relation. In this unit, air may flow transversely across the cells between the confronting faces of the fins. Any desired number of attached strips may be severed from the web to correspond to the number of tubing-sections.

For quantity production of units having tubing-sections of the same length, sections of the web with transverse planar faces connected by serial bends sufficient to form fins along corresponding lengths of tubing are sheared from the fabricated and serially bent webs, and strips are severed for their individual assembly with tubing-sections. This expedites assembling of the units.

These different units are all adapted to be provided with fins from the fabricated strips or sections derived from an elongated web without additional or special fabrication for different units.

In all units, after the fins have been assembled with the several forms of tubing, the tubing which is usually formed of copper is expanded either by hydraulic pressure or expansion-mandrels to force the outer periphery of the tubing into a pressure fit or engagement with the inner peripheries of the annular flanges 23 for efficient heat-conduction.

The foregoing exemplifies the production from a continuous web of stock of fabricated strips with bends having portions intermediate the bends adapted to form fins; for tubing with single or multiple sections; tubing-coils disposed side-by-side; for cells extending transversely of a coplanar series of tubing-sections; or series of differently spaced coplanar tubing-sections.

The invention also exemplifies a method of expeditiously and economically fabricating products for forming cross-fins on different forms of tubing in different heat-units.

The invention also exemplifies a fabricated product from a continuous web of fin-stock, which without individual additional fabrication, is adapted for forming fins on a wide diversity of units.

The invention is not to be understood as restricted to the details set forth since these may be modified within the scope of the appended claims without departing from the spirit and scope of the invention.

Having thus described the invention what I claim as new and desire to secure by Letters Patent is:

1. The method of fabricating finned heat transfer tubing from flat sheet metal stock and cylindrical tube stock which comprises: forming in a wide sheet of metal fin stock a plurality of spaced rows of equally spaced longitudinally extending circular tube openings surrounded by truly continuous annular flanges which project out of the plane of the tube stock alternately in opposite directions, bending the wide sheet of metal fin stock transversely midway between adjacent openings alternately in opposite directions to bring the openings in each row into approximate axial alignment and thus provide an accordion-pleated fin structure in which adjacent folds extend at a slight angle to each other, severing the thus bent wide sheet along longitudinal lines between the longitudinally extending rows of openings to produce individual accordion-pleated strips of the sheet metal stock, each of which strips embodies a single row of the openings, inserting a straight length of cylindrical tube stock of a diameter less than the diameter of said openings through the openings and surrounding flanges of each accordion-pleated strip to loosely position the strip over the length of cylindrical tube stock, and, finally, expanding each length of tube stock within the openings in the loosely positioned strip into intimate face-to-face frictional contact with the inside surfaces of said flanges.

2. The method of fabricating finned heat transfer tubing from flat sheet metal stock and cylindrical tube stock as set forth in claim 1, including, the additional step of attaching U-shaped tube stock sections to certain pairs of adjacent straight tube lengths to effect continuity of communication through the tube lengths.

3. The method of fabricating finned heat transfer tubing from flat sheet metal stock and cylindrical tube stock which comprises: forming in a wide sheet of metal fin stock a plurality of spaced longitudinal parallel rows of equally spaced circular tube openings surrounded by truly continuous annular flanges which project out of the plane of the tube stock alternately in opposite directions, corresponding openings in the various rows extending in transverse alignment to provide transverse rows of such openings while simultaneously slitting the flat sheet metal stock longitudinally at restricted regions thereof between adjacent longitudinal rows with the slits spanning the overall longitudinal extent of two adjacent openings and being separated by intervening tear-off tabs, bending the wide sheet of metal fin stock transversely midway between adjacent openings alternately in opposite directions to bring the openings in each row into approximate axial alignment and thus provide an accordion-pleated fin structure in which adjacent folds extend at a slight angle to each other, severing the thus bent wide sheets by tearing said tabs to produce individual accordion-pleated strips of the sheet metal stock, each of which strips embodies a single row of the openings, inserting a straight length of cylindrical tube stock of a diameter less than the diameter of said openings through the openings and surrounding flanges of each accordion-pleated strip to loosely position the strip over the length of cylindrical tube stock, and, finally, expanding such length of tube stock within the openings in the loosely positioned strip into intimate face-to-face frictional contact with the inside surfaces of said flanges.

References Cited in the file of this patent

UNITED STATES PATENTS

| | | |
|---|---|---|
| 785,081 | Brinkman | Mar. 21, 1905 |
| 1,773,249 | Yeager | Aug. 19, 1930 |
| 1,921,041 | Reynolds | Aug. 8, 1933 |
| 1,940,963 | McIntyre | Dec. 26, 1933 |
| 1,955,837 | Scholl | Apr. 24, 1934 |
| 1,984,938 | Mason et al. | Dec. 18, 1934 |
| 2,063,736 | Hardiman | Dec. 8, 1936 |
| 2,252,209 | Schank et al. | Aug. 12, 1941 |

FOREIGN PATENTS

| | | |
|---|---|---|
| 826,416 | France | Mar. 3, 1938 |
| 1,000,407 | Germany | Jan. 10, 1957 |